Figure 1:
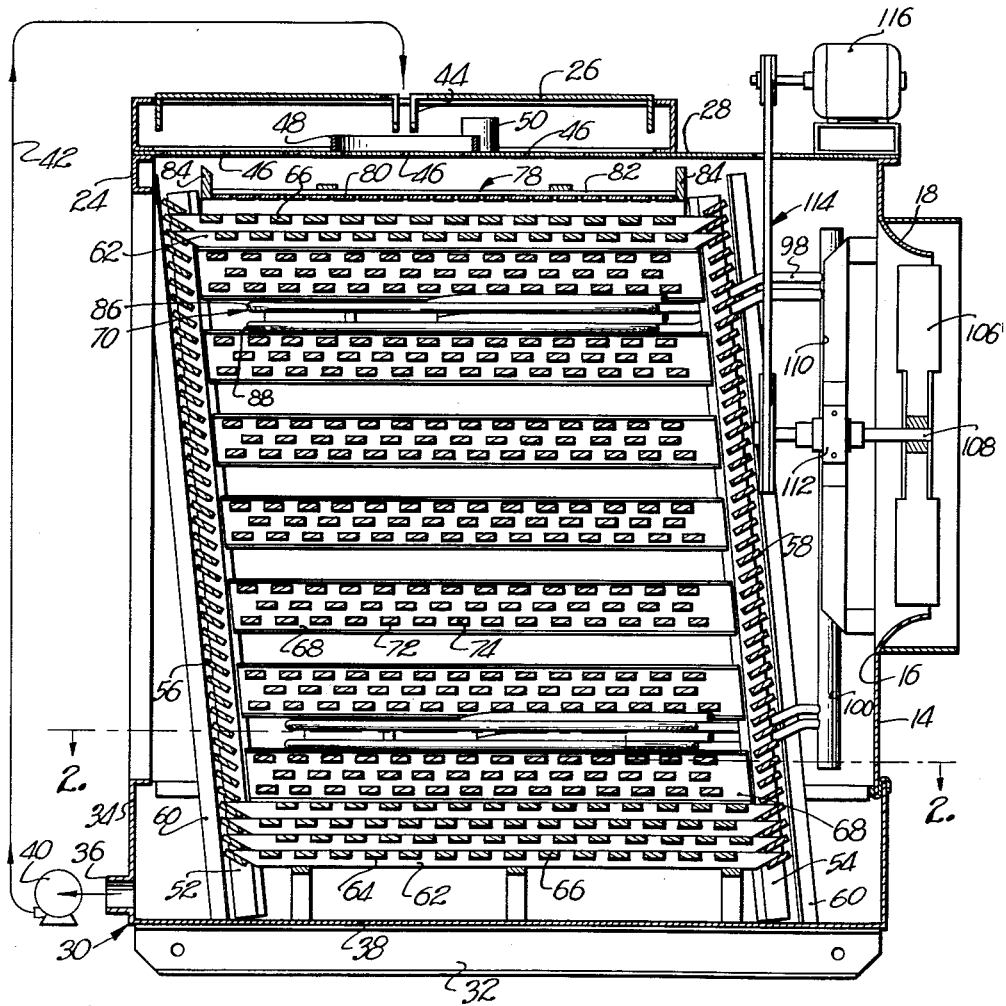

Dec. 12, 1961 D. M. DART ET AL 3,012,416
EVAPORATIVE COOLING APPARATUS
Filed Sept. 28, 1959 2 Sheets-Sheet 1

INVENTORS.
David M. Dart
Richard J. Stone
BY
Hovey, Schmidt, Johnson & Hovey
ATTORNEYS.

Dec. 12, 1961  D. M. DART ET AL  3,012,416
EVAPORATIVE COOLING APPARATUS
Filed Sept. 28, 1959  2 Sheets-Sheet 2
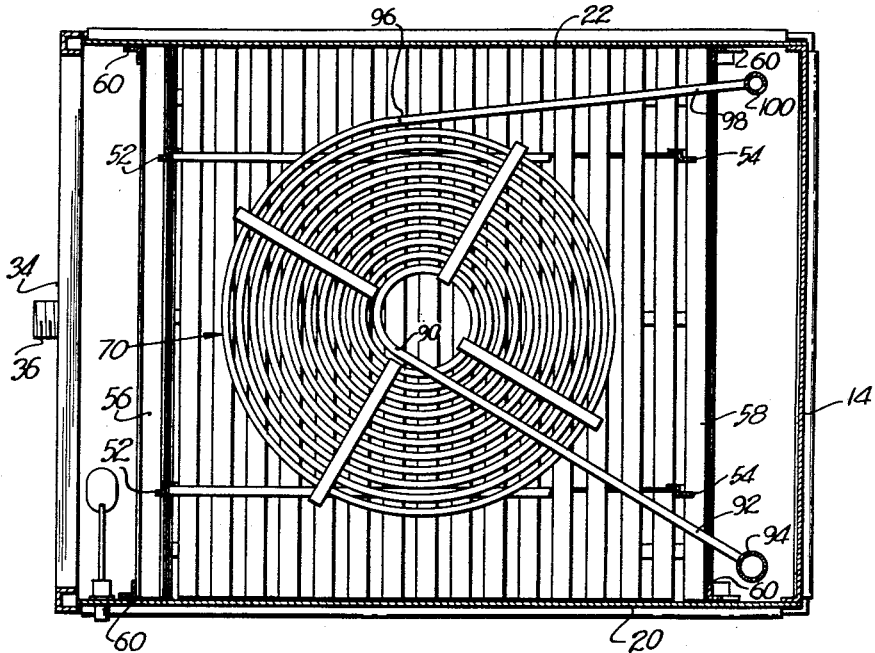
Fig. 2.
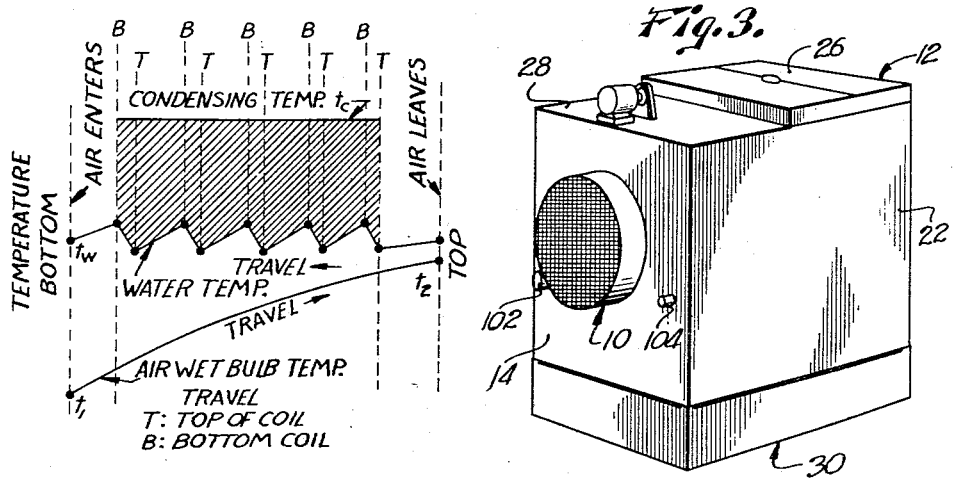
Fig. 5.
Fig. 3.
INVENTORS
David M. Dart
Richard J. Stone
BY
Hovey, Schmidt, Johnson & Hovey
ATTORNEYS.

United States Patent Office 3,012,416
Patented Dec. 12, 1961

3,012,416
EVAPORATIVE COOLING APPARATUS
David M. Dart, Prairie Village, and Richard J. Stone, Overland Park, Kans., assignors to The Marley Company, Kansas City, Mo., a corporation of Delaware
Filed Sept. 28, 1959, Ser. No. 842,666
4 Claims. (Cl. 62—305)

This invention relates to cooling equipment and particularly, to the type known generically as evaporative condensers wherein the vapor to be condensed is passed through a coil flooded with water and cooled by flow of air that evaporates some of the water.

Various types of evaporative condensers have previously been used to condense fluid, such as refrigerant vapors, with smaller volumes of air and less condensing tube surface areas than with air cooled condensers, but the full potential of equipment of this type has not heretofore been reached because of rapid heating of the water as the same flows over the condenser coils, thereby materially decreasing the rate of thermal transfer and thus necessitating the utilization of larger coil surface area than would otherwise be required.

It is therefore the primary object of the present invention to provide evaporative cooling apparatus for condensing refrigerant vapors and the like, wherein maximum thermal exchange efficiency is obtained by maintaining the temperature difference between the water and the refrigerant vapor at a maximum during the heat transfer process and with a minimum volume of air and coil surface area being needed to effect complete conversion of the refrigerant vapor to a liquid.

Also an important object of the invention is to provide highly efficient evaporative cooling apparatus as referred to above wherein the difference in temperature between the vapor and the water is maintained at a maximum throughout the condensing process by the expedient of intermingling the condenser coils with fill assembly structure which breaks the water passing through the apparatus into small droplets, thereby increasing the surface area of the water exposed to currents of air directed through the condensing unit and thus precluding heating of the water to a temperature approaching that of the vapor, at all points throughout the condensing apparatus.

Another important aim of the invention is to provide evaporative cooling apparatus wherein the condensing coils intermingled with the fill assembly structures are connected to respective vapor supply and liquid return lines in parallel relationship to obtain maximum vapor condensation utilizing a minimum tube surface area by virtue of the fact that after conversion of a vapor to a liquid, the latter passes immediately into the liquid return line and is not caused to flow through a large section of the condensing coil.

Also a salient object of the instant invention is to provide evaporative cooling apparatus having reduced condenser tubing area as compared with prior units of the same rating, whereby the apparatus may be manufactured in more compact form and reducing the quantity of material necessary to construct the unit as well as fabrication time thereof.

Another important aim of the invention is to provide an evaporative condenser as described above whereby the condensing coils may be more easily cleaned than in prior units, caused by mineral scaling on the outer surfaces of the coils and further, which resists scaling to a much higher degree because of the fact that the water is not raised to as high a temperature as in previous evaporative cooling assemblies, and also by virtue of the fact that more water is caused to flow over the condensing coils than in heretofore available units.

A further important object of the invention is to provide evaporative cooling apparatus wherein is included a plurality of individual condenser units having means therebetween for breaking water passing through the apparatus into a form such as droplets to present large surface areas exposed to the air for evaporative cooling of such water, whereby the temperature of the same is prevented from rising to a high level and further, the means for breaking the water into droplets serving as a redistribution device assuring subjection of the coils to substantially uniform quantities of water, notwithstanding passage of currents of air through the apparatus.

An additional important object of the present invention is to provide apparatus which may be employed to modify presently existing propeller or centrifugal fan cooling towers to convert the same into evaporative cooling units.

A further important object of the invention is to provide compact evaporative cooling apparatus characterized by greater heat transfer rates and lower coil surface area permitting utilization of a smaller refrigerant charge to produce the same amount of cooling.

Other important objects and details of the present apparatus will be described or become obvious as the following specification progresses.

Figure 4:
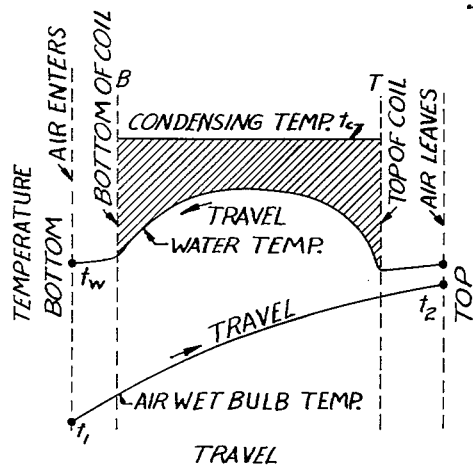

In the drawings:
FIGURE 1 is a vertical cross-sectional view of evaporative cooling apparatus embodying the preferred concepts of the present invention, with the water return means forming a part thereof being shown schematically;
FIG. 2 is a horizontal cross-sectional view taken on the line 2—2 of FIG. 1 and looking downwardly in the direction of the arrows;
FIG. 3 is a perspective view on a reduced scale of the present apparatus and illustrating the outer casing thereof;
FIG. 4 is a diagrammatic representation of the temperature of water as the same is passed over a single coil evaporative condenser; and
FIG. 5 is a schematic showing of the water temperature plotted as the latter falls successively through a plurality of condenser coils separated by fill assembly structures in accordance with the present invention.

Evaporative cooling apparatus 10 includes an outer casing 12 of galvanized sheet metal or the like and provided with a front wall 14 having a circular outlet opening 16 therein surrounded by an annular, transversely arcuate, funnel-shaped section 18 either joined to or integral with front wall 14. Opposed side walls 20 and 22 connect front wall 14 to a rear channel 24 positioned directly below inverted, pan-shaped top segment 26, with the latter being coupled to top wall 28 bridging side walls 20 and 22 and joined to the uppermost margin of front wall 14. A pan-shaped sump 30 is joined to the lowermost margins of front wall 14 and side walls 20 and 22 and is provided with at least two longitudinally extending supports 32 on the bottom thereof for maintaining sump 30 out of engagement with a suitable supporting structure.

The rearmost wall 34 of sump 30 has an outlet pipe 36 connected thereto adjacent bottom 38 of sump 30 for permitting water to flow therefrom to a pump 40 and thence via conduit 42 to the inlet spout 44 of pan-shaped top segment 26.

Top wall 28, preferably extending the entire length of side walls 20 and 22, has a number of perforations 46 therein beneath segment 26 which serves as a distribution basin. It is preferred to provide an annular splash ring 48 secured to the uppermost face of top wall 28 in concentric relationship to spout 44, with overflow ring 50 preventing building up of pressure within the distribution section presented by segment 26 if the inflow of water thereinto would be greater than could drain through perforations 46 in top wall 28.

A pair of elongated, angularly disposed, upright supports 52 adjacent the air inlet of casing 12 defined by the open, rearmost end thereof, as well as a similarly angularly disposed pair of supports 54, have complemental notches therein receiving respective elongated, horizontally disposed, transversely inclined slats 56 and 58 respectively. Slats 56 serve as inlet louvers while slats 58 function as drift eliminators to prevent excessive loss of water from casing 12 during operation of the equipment to be hereinafter described. It is to be noted that supports 52 and 54 are parallel and disposed with the lower margins thereof in greater spaced relationship to the inlet opening of casing 12 than the upper extremity thereof. Thus, the structure carried by supports 52 and 54 is inclined in the direction of drift of water caused by passage of air currents through casing 12. Angle irons 60, each secured to a respective side wall 20 or 22 in proximal relationship to a corresponding row of slats 56 and 58, serve to preclude dislodgment of the slats from respective supports 52 and 54 without removal of angle irons 60 from casing 12.

At least two horizontally spaced, vertically superimposed rows of cross members 62 spanning the distance between louvers 56 and eliminators 58 within sump 30 but spaced from bottom 38 thereof, have notches 64 in the upper margins thereof receiving respective horizontally disposed, spaced slats 66 which serve to break up the water gravitating from the distribution basin defined by segment 26. For purposes of convenience, opposed ends of cross members 62 may be angled to complementally engage the upper faces of respective slats 56 and 58 to support slats 66 in proper position, as best shown in FIG. 1. The number of cross members 62 in each vertical row thereof is dependent upon the particular tower and the temperature to which the water must be lowered prior to gravitation into sump 30 for redistribution to the top of casing 12.

A number of pairs of horizontally aligned and spaced perforated plates 68 are secured to supports 52 and 54 at opposed ends of plates 68, with the latter being in sufficient vertically spaced relationship to receive respective condenser units 70 therebetween. As illustrated in FIG. 1, each of the plates 68 has a plurality of horizontally aligned openings 72 therein for receiving slats 74 which are similar to slats 66 and preferably of deterioration-resistant material such as redwood. Another series of horizontally spaced, vertical rows of cross members 62 are positioned in overlying relationship to the uppermost pair of plates 68 and also serve to support slats 66 immediately below a secondary distribution basin 78 underlying the part of top wall 28 immediately below top segment 26. For the present purposes, a number of transversely extending slats 80, held in predetermined positions by longitudinal slats 82 secured to end boards 84, produce the desired breakup of the water prior to passage of the same onto the uppermost slats 66 carried by upper cross member 62.

Each of the condenser units 70 disposed between adjacent plates 68 and thereby slats 74 carried by the same, includes a pair of substantially identical, vertically spaced tubes 86 and 88 both of spiral configuration, with the curved stretches thereof lying in common respective, vertically spaced planes. The innermost extremity 90 of each of the tubes 86 and 88 is integral with a relatively straight conduit 92 which communicates with a vapor supply pipe 94 positioned within casing 12 adjacent the innermost face of front wall 14 and in a vertical location. The outermost extremity 96 of each of the tubes 86 and 88 is integrally connected to a straight conduit 98 communicating with an upright liquid return pipe 100, also located within casing 12 proximal to the innermost surface of front wall 14 and in proximity to side wall 22, whereas pipe 94 is adjacent side wall 20. Since all of the tubes 86 and 88 are coupled directly to pipes 94 and 100, it can be seen that vapor is delivered to the condensing tubes in substantially equal volumes by virtue of the parallel connections. Horizontal vapor supply line 102 and return line 104 extending through front wall 14 and coupled with corresponding pipes 94 and 100, serve to direct the vapor refrigerant from the refrigeration mechanism and to return the condensed refrigerant thereto.

Means for directing currents of air through casing 12 comprises a fan 106 mounted on shaft 108 and positioned within the opening presented by annular section 18. Support means 110 carried by front wall 14 within casing 12 mounts a bearing 112 rotatably carrying shaft 108 in a horizontal position, with belt and pulley means 114 serving to interconnect shaft 108 and motor 116 disposed on top wall 28 adjacent front wall 14.

In operation, motor 116 is actuated to cause fan 106 to be turned through belt and pulley means 114 and shaft 108 in a direction to pull air inwardly through the inlet defined by channel 24, the upper margin of wall 34 of sump 30 and the upright rear margins of side walls 20 and 22, whereby such air passes between parallel inlet slats 56, thence horizontally through the fill sections presented on opposed sides of condenser units 70 as well as across the latter, then between eliminator slats 58 and finally through annular section 18.

Pump 40 is also placed in operation to direct water from sump 30 outwardly through pipe 36, thence through pump 40, next through conduit 42 and finally into the distribution basin presented by segment 26 for discharge into secondary basin 78 through perforations 46. The streams of water pasing from the openings between slats 80 and 82 gravitate onto the upper slats 66 whereby the water is broken into droplets and thus cooled by virtue of the relatively large surface area of the water exposed to the currents of air passing horizontally through casing 12. The cool water then floods over the outer surfaces of tubes 86 and 88 of the upper condenser unit 70, it being understood that vapor is directed into tubes 86 and 88 via line 102, pipe 94, conduit 92 and into the central part of each of the coils, while liquid condensed by the water as well as air passing over the upper condenser unit 70, is directed into return line 104 via conduit 98 and pipe 100.

As the water passes over the upper condenser unit 70, the temperature of the same is raised by virtue of the thermal interchange effecting condensing of the refrigerant vapor, and thus the fill section below the upper condenser unit 70 serves to again break the water up into droplets and permits the same to be exposed to the currents of air whereby the water is cooled to substantially the same temperature at which the same initially engaged the upper surface of tube 86 of the uppermost condenser unit 70. It is pointed out that the number of slats 74 carried by opposed pairs of members 68 and defining a fill assembly, are chosen so that the water is subjected to sufficient air and broken into droplets sufficient to cool the same to the same temperature at which the water initially contacted the condenser unit 70 therenext above. It can be appreciated that the number of slats and the vertical height of each of the fill assemblies between adjacent condenser units 70 may be computed when factors such as the vapor temperature of the refrigerant, the problem maximum temperature of the ambient air and the quantity of air drawn into casing 12 by fan 106, are properly correlated.

Although the preferred embodiment of the invention and which is illustrated, employs coils which are in parallel with the vapor supply and liquid return lines, it can be appreciated that other arrangements may be provided depending upon the conditions which must be met. For example, one type of modification would be to employ a sub-cooling coil either within the flow of water gravitating through casing 12 or within the air stream and without being subjected to the water.

The variations in temperature of the recirculated water in apparatus 10, utilizing prior evaporative condensers wherein the water was passed over only one bank of coils, is illustrated in FIG. 4 wherein the air flow is represented from left to right and water flow from right to left. The water temperature, leaving the distribution deck and represented at the far right, drops slightly on passing through the area above the coil where the water is subjected to some evaporation, then rises sharply as it contacts the outer surfaces of the hot tubes, with decrease in temperature then taking place as the bottom of the serpentine tube is approached. A slight further decrease occurs while the water drops through other portions of the air stream between the bottom of the coil and the sump pan. It can be seen that the temperature of the water very closely approaches the condensing temperature of the refrigerant vapor, thereby lowering the efficiency of the condensing operation inasmuch as maximum difference between condensing temperature and temperature of the water throughout the cooling operation is desirable in order to obtain maximum efficiency from the surface area of the cooling coils subjected to the water.

FIG. 5 represents a graphical representation of variations in the temperature of the recirculated water, utilizing apparatus 10, wherein it can be seen that the air flow is also from left to right while the water flow is from right to left. The water temperature, leaving secondary distribution means 78 and passing through the upper fill assemblies, drops slightly but then begins to rise when contacting the uppermost tubes 86 and 88 of the top condenser unit 70. However, the water is not permitted to rise to a very high level because only two pancake type coils are employed in the upper condenser unit and thus the water, after rising a slight degree, is then passed through another fill assembly which lowers the temperature thereof to the same temperature at which the water was initially directed over the uppermost cooling condenser. This pattern is followed until the water reaches sump 30 for redistribution to the top of the casing. It can be recognized that the difference between the temperature of the water and the condensing temperature of the refrigerant is maintained at a maximum throughout passage of the water successively through condensing units 70 and thus materially increased efficiency is obtained with much less tube surface area being required and also permitting reduction in the amount of actual refrigerant used for a particular installation.

Since the slats forming the fill section of apparatus 10 as well as inlet slats 56 and eliminator slats 58 may readily be removed from casing 12, cleaning of tubes 86 and 88 of condenser units 70 is rendered much easier than with prior units. However, scaling is also reduced with the instant apparatus because of heavy flooding of tubes 86 and 88 with water and redistribution of such water by each of the fill assembly structures to prevent only certain areas of the lower coils being subjected to the water as the latter tends to drift under the influence of currents of air passing through the casing. Not only does the fill structure serve to redistribute the water, but inclining the entire cooling structure within casing 12 in the direction of air flow assures subjection of all of the condenser coils to substantially equal volumes of water. Noteworthy also is the fact that the water is not raised to as high a temperature as with prior units, thereby further reducing the tendency of minerals being deposited on the tubes during operation of the apparatus.

Apparatus 10 provides more effective cooling because of a greater thermal head, the unit has reduced condenser tubing area over prior equipment of similar rated capacity, the component thereof may be readily cleaned when necessary although maintenance is not required as often with the instant apparatus, and the unit may be constructed in very compact size to permit installation thereof in areas where other types of units are not suitable.

Having thus described the invention what is claimed as new and desired to be secured by Letters Patent is:

1. In evaporative cooling apparatus, an outer casing provided with an air inlet and an air outlet disposed in horizontally spaced relationship; a plurality of individual condenser units mounted within the casing in vertically spaced disposition between said air inlet and the air outlet, each of said condenser units including an elongated conduit in spiral configuration presenting a coil lying in substantially a horizontal plane; means operably coupled with said units for supplying vapor thereto and for removing liquid from the same upon condensation of the vapor, said means being connected to said units in parallel supply and return relationship; coolant liquid means carried by said casing in overlying relationship to the uppermost condenser unit for delivering coolant liquid onto the units in successive contacting engagement with the outer surfaces thereof; basin means at the lower end of said casing for collecting the coolant liquid gravitating through the condenser units; means communicating with the basin and the coolant liquid distribution means respectively for removing coolant liquid from the basin and returning the same to the distribution means; means on the casing for forcing relatively cool air through the casing from the air inlet to the air outlet thereof in substantially perpendicular, intersecting relationship to the coolant liquid gravitating through the casing from the distribution means to said basin to thereby effect cooling of the coolant liquid; and fill assembly means between adjacent condenser units disposed to break up the coolant liquid into droplets to increase the outer surface area of the coolant liquid before passage of such coolant liquid over the unit therenext below, said fill assembly means each including a sufficient number of slats and the adjacent condenser units being positioned in sufficient vertical spaced relationship to maintain the temperature of the coolant liquid, during successive passage over said condenser units, at a temperature at the time of initial engagement of the coolant liquid with a respective condenser unit, at least approximately as low as the temperature of the coolant liquid first engaging the upper part of the uppermost condenser unit.

2. Evaporative cooling apparatus as set forth in claim 1 wherein each of said condenser units includes a pair of said coils in parallel, proximal, vertically aligned relationship.

3. Evaporative cooling apparatus as set forth in claim 1 wherein said fill assemblies and the condenser units are vertically offset in the direction of travel of said currents of air with the uppermost fill assembly being in closer proximity to said air inlet than the lowermost fill assembly.

4. Evaporative cooling apparatus as set forth in claim 1 wherein the vertically adjacent slats of said fill assemblies are positioned in overlapping, vertically offset relationship with the upper and lower faces of each of the slats being located in substantially parallel horizontal planes.

References Cited in the file of this patent

UNITED STATES PATENTS

| | | |
|---|---|---|
| 1,287,630 | Burhorn | Dec. 17, 1918 |
| 2,644,322 | Preble | July 7, 1953 |
| 2,650,082 | Mart | Aug. 25, 1953 |
| 2,733,055 | Ophuls | Jan. 31, 1956 |
| 2,819,048 | Gilliland | Jan. 7, 1958 |